United States Patent [19]

Schienle et al.

[11] Patent Number: 5,352,540
[45] Date of Patent: Oct. 4, 1994

[54] STRAIN-TOLERANT CERAMIC COATED SEAL

[75] Inventors: James L. Schienle; Thomas E. Strangman, both of Phoenix, Ariz.

[73] Assignee: AlliedSignal Inc., Morris Township, Morris County, N.J.

[21] Appl. No.: 936,141

[22] Filed: Aug. 26, 1992

[51] Int. Cl.$^5$ .................. B32B 3/30; B32B 15/04; F01D 11/00
[52] U.S. Cl. ..................... 428/623; 428/633; 428/141; 428/148; 428/469; 415/170.1
[58] Field of Search ............... 428/623, 632, 633, 687, 428/457, 469, 141, 148, 167; 415/170.1, 173.4, 173.5, 174.5; 277/53, 215, 207 R

[56] References Cited

U.S. PATENT DOCUMENTS

| | | | |
|---|---|---|---|
| 3,365,172 | 1/1966 | McDonough et al. | 415/173.4 |
| 3,481,715 | 12/1969 | Whalen | 29/195 |
| 3,719,519 | 3/1973 | Perugini | 117/71 |
| 3,754,903 | 8/1973 | Goward et al. | 75/171 |
| 4,005,989 | 2/1977 | Preston | 29/194 |
| 4,055,705 | 10/1977 | Stecura et al. | 428/633 |
| 4,093,879 | 6/1978 | Marchant et al. | 310/11 |
| 4,145,481 | 3/1979 | Gupta et al. | 428/676 |
| 4,485,151 | 11/1984 | Stecura | 428/633 |
| 4,594,053 | 6/1986 | Söhngen | 428/632 |
| 4,615,865 | 10/1986 | Duvall et al. | 420/588 |
| 4,675,204 | 6/1987 | Nicoll et al. | 427/35 |
| 4,676,994 | 6/1987 | Demaray | 427/42 |
| 4,752,535 | 6/1988 | Kvernes | 428/547 |
| 4,764,089 | 8/1988 | Strangman | 415/174 |
| 4,801,510 | 1/1989 | Mehrotra et al. | 428/698 |
| 4,861,618 | 8/1989 | Vine et al. | 427/34 |
| 4,884,820 | 12/1989 | Jackson et al. | 415/173.5 |
| 4,897,315 | 1/1990 | Gupta | 428/552 |
| 4,914,794 | 4/1990 | Strangman | 29/889.2 |
| 4,915,814 | 4/1990 | Harada et al. | 204/425 |
| 4,943,487 | 7/1990 | Benn et al. | 418/552 |
| 4,950,558 | 8/1990 | Sarin | 428/698 |
| 5,064,727 | 11/1991 | Naik et al. | 428/633 |

OTHER PUBLICATIONS

ATTAP/AGT101 Advanced Turbine Technology Applications Project, by: Allied-Signal Aerospace, Oct. 1990.

Primary Examiner—John Zimmerman
Attorney, Agent, or Firm—Jerry J. Holden; James W. McFarland; Robert A. Walsh

[57] ABSTRACT

A metallic regenerator seal is provided having multi-layer coating comprising a NiCrAlY bond layer, a yttria stabilized zirconia (YSZ) intermediate layer, and a ceramic high temperature solid lubricant surface layer comprising zinc oxide, calcium fluoride, and tin oxide. An array of discontinuous grooves is laser machined into the outer surface of the solid lubricant surface layer making the coating strain tolerant.

17 Claims, 2 Drawing Sheets

STRAIN-TOLERANT CERAMIC COATED SEAL

GOVERNMENT RIGHTS

The Government of the United States of America has rights in this invention pursuant to Contract No. DEN3-335 awarded by the U.S. Department of Energy.

TECHNICAL FIELD

This invention relates to ceramic coatings for metal substrates and in particular to ceramic coatings for regenerator seals as well as a method of forming a segmented morphology in such coatings to make them strain tolerant.

BACKGROUND OF THE INVENTION

Because rotary regenerators for gas turbine engines are now being made of a ceramic material, they require seals formed from material that can provide sufficient coating wear life. To achieve this wear life, this material must be oxidation resistant at temperatures up to and exceeding about 1600° F., and have a low coefficient of friction to minimize torque loads on the regenerator.

Typically, these seals have multi-layer coatings with a surface layer of a high temperature, ceramic solid lubricant. For example, U.S. Pat. No. 3,481,715 discloses a regenerator seal having a surface layer comprised of nickel oxide, calcium fluoride, and calcium oxide. Another common surface layer is comprised of zinc oxide, calcium fluoride, and tin oxide. A common problem with these surface layers is their inability to accommodate large mismatch strains due to thermal expansion, distortions of the metallic substrate resulting from pressure induced deflection, and seal creep (permanent deformation). Additionally, experimental test results suggest that these solid lubricant ceramic coatings may sinter (densify) during high temperature operation, thus contributing further to strain mismatch problems. All of the above strain mismatch scenarios can lead to premature failure of the ceramic surface layer. Of particular concern is the possibility of massive spalling which can lead to damage and subsequent failure of both the seal and the ceramic regenerator core.

U.S. Pat. No. 4,914,794, which is assigned to the assignee of this application and shares a common inventor, discloses a method for making an abradable ceramic, (i.e. stabilized zirconia), turbine shroud coating strain tolerant by plasma spraying or other line of sight deposition process to form shadow gaps that result in a segmented morphology. Attempts to apply this method of segmentation to a regenerator seal's ceramic, solid lubricant coating was not successful primarily due to the lower melting points of the solid lubricant coating relative to the abradable turbine shroud stabilized zirconia coatings. The lower melting point of the ceramic solid lubricant coatings resulted in increased molten particle flow during plasma spraying, which resulted in the shadow gaps being bridged. The resulting coating exhibited poor thermal strain tolerance, with coatings failing prematurely under cyclic thermal exposure.

Accordingly there is a need for a method of forming a segmented morphology in a solid lubricant ceramic coating having lower melting temperatures than stabilized zirconia abradable shroud coatings.

SUMMARY OF THE INVENTION

An object of the present invention is to provide a method for forming a segmented morphology in a solid lubricant ceramic Coating having lower melting temperatures than stabilized zirconia abradable shroud coatings.

Another object of the present invention to provide a regenerator seal having solid lubricant ceramic coating that is strain tolerant.

The present invention achieves these objects by providing a regenerator seal having a coating comprising a bond layer covering the seal substrate, an intermediate layer, and then a ceramic solid lubricant surface layer coating with a segmented morphology. The segmented morphology is defined by an array of short slots or grooves 5 which extend from the outer surface of the surface layer inwards through more than half the thickness of the coating but without piercing the underlying layers or substrate. The surface layer is applied by plasma spraying, or other suitable technique for thick ceramic coatings, to the seal substrate that has been pretreated with the necessary bond and intermediate layers. Then the surface layer is machined flat to provide a suitable sealing surface topography. Grooves are then formed in the surface coating by using a carbon dioxide laser. The grooves are discontinuous across the seal coating face so not to provide a gas leak path between the high pressure and low pressure sides of the seal.

DESCRIPTION OF THE INVENTION

Figure 1:
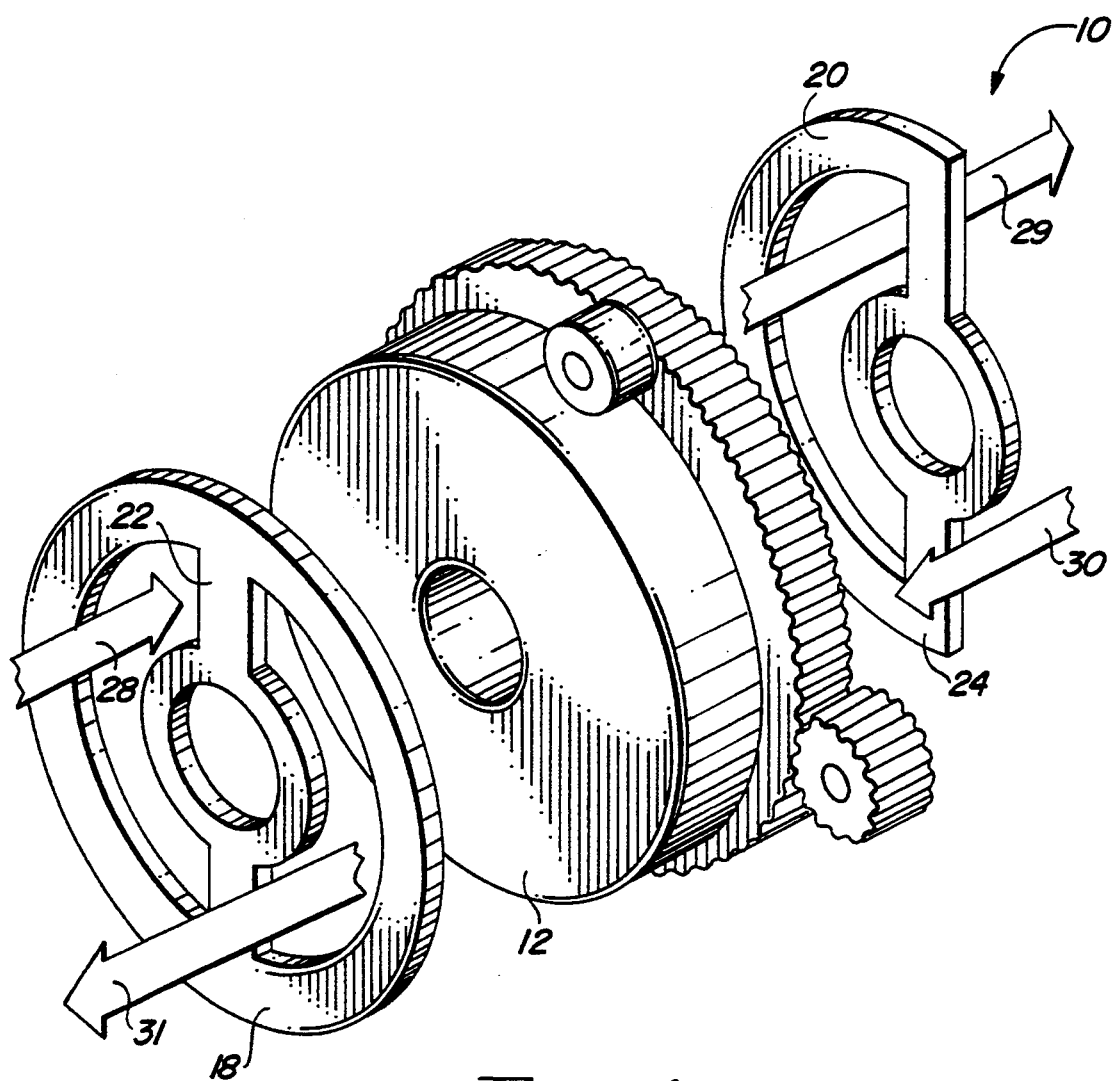
FIG. 1 shows a typical rotatory regenerator system including the regenerator core and regenerator rubbing seals.

Referring to FIG. 1, a regenerator, or rotating counter flow heat exchanger, to which the present invention relates is generally denoted by the reference numeral 10. The regenerator 10 comprises a rotating regenerator core 12, typically fabricated from low expansion glass-ceramic material, such as aluminum silicate or magnesium aluminosilicate, and a pair of regenerator seals 18,20 which are also referred to as rubbing seals. The seals 18,20 are located on the hot and cold sides, respectfully, of the core 12.

When mounted in a gas turbine engine, the regenerator seal crossarms 22,24 split the engine's flow path into two. The first flow path, represented by arrow 28, delivers low pressure, hot gas from the turbine discharge to the hot side of the core 12 as the second flow path, represented by arrow 30, delivers high pressure, cool gas from the compressor discharge to the cold side. Within the rotating core 12 the thermal energy from the hot gas is transferred to the cool gas so that low pressure, low temperature gas is discharged from the core 12, represented by arrow 31, and high pressure, hot gas is discharged from the core 12 as represented by arrow 29. The regenerator seals 18,20 separate the low pressure gases from the high pressure gases.

While the following description will only reference the seal 18, it is none the less applicable to the seal 20. The seal 18 is formed from a superalloy such as Haynes 230, Incoloy MA956, or HS-25. Superalloys are generally those alloys characterized as nickel, iron or cobalt based alloys which display high strengths at high temperatures. In the preferred embodiment, the substrate surface 32 of the seal 18 is fabricated to have a series of longitudinal grooves. The grooves have a nominal depth of about 0.030 inches deep, measuring from peak to valley. Also the nominal distance between groove centers is 0.050 inches. These grooves enhance adhesion of any coating layers applied thereon. Depending on the particular seal material, the grooves may be manufactured by a variety of techniques including machining, electrodischarge machining, electrochemical machining, and laser machining.

Figure 2:
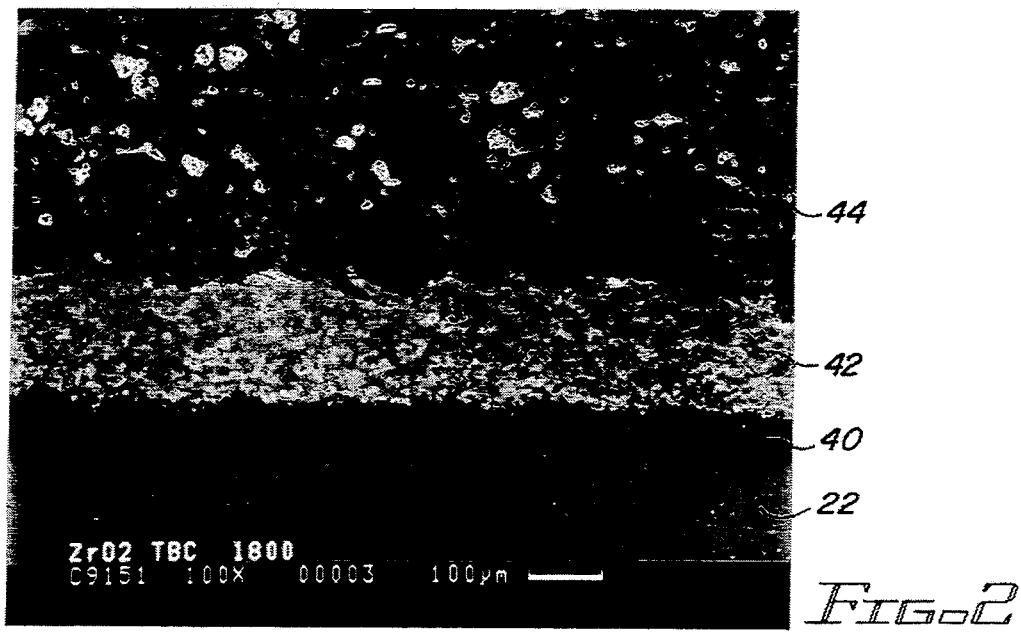
FIG. 2 is a photomicrograph showing a coated substrate.

Referring to FIG. 2, after a conventional grit cleaning operation, a thin bonding layer 40 of oxidation resistant material, such as NiCrAlY having the composition 23 weight percent chrome, 6 weight percent aluminum, 0.5 weight percent yttrium, and the balance being nickel, is applied onto the grooved surface 32 by a low pressure or vacuum plasma spray process or an inert gas (e.g. argon) shrouded air plasma spray process. The layer 40 has a preferred thickness of about 0.004 inches. The NiCrAlY layer 40 provides a high degree of adherence to the nickel based metallic surface 32 and also to a ceramic intermediate coating layer 42 described below.

The intermediate layer 42 of yttria stabilized zirconia, (hereinafter referred to as YSZ), is applied to the surface of the NiCrAlY layer 40 by an air plasma spray gun to a thickness of about 0.010 inches. The YSZ layer 42 has a composition similar to conventional thermal barrier coatings and nominally contains 8 weight percent yttria to inhibit formation of large volume fraction of monoclinic phase. Additionally, the process for applying the YSZ layer is the same as used for thermal barrier coating applications and can be performed by companies such as APS, located in Dayton, Ohio.

Again referring to FIG. 2, a ceramic solid lubricant surface coating layer 44 having the composition 56 weight percent zinc oxide, 29 weight percent calcium fluoride, and 15 weight percent tin oxide is applied to the surface of YSZ layer 42 by an air plasma spray gun. The layer 44 has a preferred thickness of about 0.040 to 0.050 inches and can be applied by the same companies that apply the layer 42. The as-sprayed surface layer 44 has surface asperities which must be machined off to provide a smooth surface with sufficient tribological and sealing characteristics. The as-sprayed surface asperities of the surface layer 44 are removed by machining so that the layer 44 has a final thickness of about 0.035 to 0.045 inches. Each constituent of the solid lubricant layer 44 has a melting point less than the melting point of stabilized zirconia, though the layer 44 need only have a single constituent with such a melting point.

A method for forming a segmented morphology in the layer 44 begins with the coated hot side regenerator seal 18 prior to mounting in the gas turbine engine. No pre-treatment of the regenerator seal is required.

Figure 3:
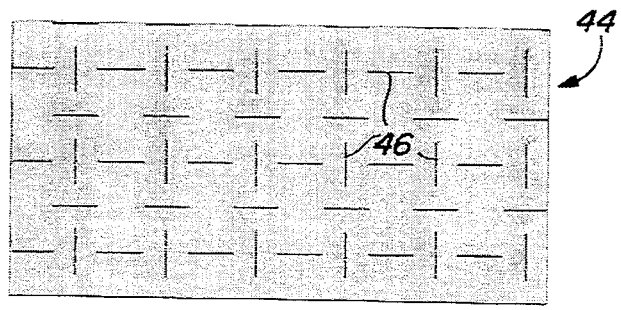
FIG. 3 is a photomicrograph showing a top view of the surface layer of the coated substrate of FIG. 2 after cutting segmentation grooves into the surface layer.
Figure 4:
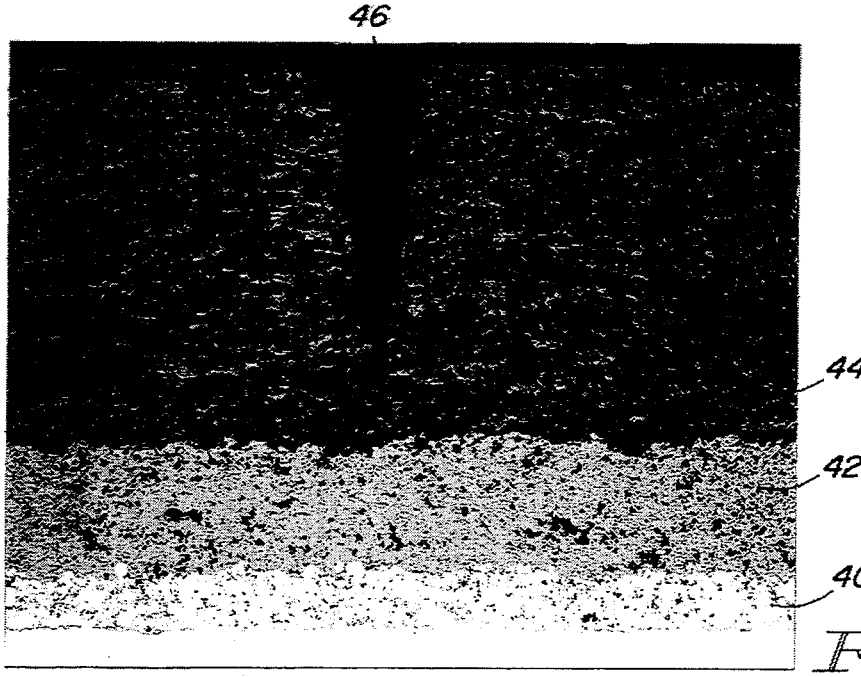
FIG. 4 is a photomicrograph showing a cross-section of the coated substrate of FIG. 3.

As shown in FIGS. 3 and 4, an array of discontinuous grooves 46 are cut into the outer surface of the layer 44 using a carbon dioxide laser. A laser power setting of 50 Watts, pulse spacing setting of 0.006 inch, pulse width of 400 microseconds, and gas air assist pressure of 40 pounds per square inch produces a series of closely spaced holes in the surface of layer 44 that in combination define each of the grooves 46. The grooves 46 penetrate more than half the thickness of the layer 44.

Importantly, the grooves 46 should not pierce the underlying layers or substrate which may be susceptible to oxidation. In the preferred embodiment, the grooves 46 have a 0.005 inch opening and taper as they extend inward to a depth of about 0.030 inches or about ¾ of the thickness of layer 44.

Referring again to FIG. 3, the grooves 46 are discontinuous so not to provide a leak path across the surface of the seal 18. The length of each groove 46 is about 0.125 inches. The pattern of segmentation consists of alternating rows of grooves 46. In the first row adjacent grooves are orthogonal to each other while in the second row the adjacent grooves are parallel. The grooves in the second row are staggered 0.125 inches from the grooves in the first row so as to create columns of grooves that are orthogonal to adjacent grooves within the column. The laser is programmed to cut the rows of grooves 46 in two orthogonal orientations such that the grooves are evenly spaced and do not intersect. A suitable array of grooves can be laser machined into the surface layer by various vendors, such as Lasertron, located in Plantation, Fla.

A series of tests were run to demonstrate the improved thermal strain tolerance in the above described regenerator seal coating system containing segmenting grooves in the surface layer. Sections of regenerator seal crossarms measuring 3.75 inches in length, 1.5 inches in width, and 0.25 inch in thickness were prepared as described above without laser segmentation of the surface coating (referred to herein as the baseline seal) and with laser segmentation of the surface coating (referred to herein as the segmented seal) and were cyclically exposed in a computer controlled Jet A fuel fired burner rig. One thermal cycle consisted of a 5 minute soak at 1700° F. or 1800° F., the latter being the maximum regenerator inlet temperature for Allied-Signal's AGT101 automotive gas turbine engine test bed, followed by a forced air quench to 400° F., which is the typical temperature of the regenerator inlet on the cold side of the regenerator core. The cyclic thermal burner rig test was used to compare the cyclic life and resistance to spalling of the baseline and segmented seals. A visual inspection of the seals was made about every 150 to 200 cycles and a failure recorded when upon visual inspection the coating had sufficiently spalled.

TABLE 1

|  | TEMPERATURE | CYCLES TO FAILURE | AVERAGE CYCLES TO FAILURE |
| --- | --- | --- | --- |
| BASELINE | 1800° F. | 24 | 56 |
|  |  | 24 |  |
|  |  | 121 |  |
| BASELINE | 1700° F. | 595 | 865 |
|  |  | 1000 |  |
|  |  | 1000 |  |
| SEGMENTED | 1800° F. | 502 | 502 |
|  |  | 502 |  |
|  |  | 502 |  |
| SEGMENTED | 1700° F. | 653 | 729 |
|  |  | 653 |  |
|  |  | 882 |  |

As shown in table 1, at 1700° F. the baseline and segmented seal have about the same average cycles to failure. Importantly, at 1800° F. the segmented seals exhibited superior cyclic life compared to the baseline seals. The average number of cycles to failure for segmented seals was 502, whereas the average number of cycles to failure for the baseline seal was 56. Thus, the laser segmentation method improved cyclic life of the coating by a factor of about 9.

The laser segmentation method can also be used for applications other than those described above. For example, the above-described method can be used to produce a segmented morphology in abradable turbine shroud coatings, thermal barrier coatings for combustor liners in turbine engines, in ducting between stages of turbines, in exit liners, and in nozzles and the like. The method can also be used to segment ceramic coatings applied to ceramic substrates such as silicon nitride, silicon carbide, aluminum oxide, and glass ceramics like lithium aluminosilicate.

While the invention has been described with reference to a particular embodiment thereof, those skilled in the art will be able to make various modifications to the described process without departing form the true spirit and scope of the invention. For example, there are numerous grooves patterns and arrays which could be used other than that described above, which was selected because of the convenience of making this groove design in the demonstration pieces constructed. As long as the grooves are discontinuous across the sealing surface so not to provide a leak path between high pressure and low pressure sides of the seal, any such groove patterns can be used. For applications other than seals, such as for abradable coatings and thermal barrier coatings, the use of continuous grooves is permitted. It is preferred that the grooves be greater than half the thickness of the ceramic top coating. However, the grooves may penetrate the entire thickness of the surface layer and penetrate underlying layers so long as none of these layers are susceptible to oxidation. Importantly, the grooves should not penetrate the metallic bond or the metallic substrate since doing so will enhance oxidation of the metal components of the seal, shroud, liners, and the like.

What is claimed is:

1. A sealing member having a low coefficient of friction and good resistance to oxidation at high temperatures when sealing against a ceramic material comprising:
   a superalloy substrate;
   a first ceramic layer over said substrate;
   an outer layer, over said first layer, of a ceramic solid lubricant having at least one constituent with a melting point less than the melting point of stabilized zirconia, said outer layer having an outer surface for sealingly engaging said ceramic material, and having a segmented morphology configured to render said outer layer more tolerant to strain.

2. The sealing member of claim 1 wherein said segmented morphology is comprised of an array of discontinuous grooves.

3. The sealing member of claim 2 wherein said grooves are formed by laser machining.

4. The sealing member of claim 1 further comprising an oxidation resistant bonding layer disposed between said substrate and said first layer.

5. The sealing member of claim 4 wherein said bonding layer is MCrAlY where M is selected from the group consisting of Ni, Co, NiCo, and Fe.

6. The sealing member of claim 5 wherein the thickness of said bonding layer is about 0.004 inches.

7. The sealing member of claim 1 wherein said substrate surface has a plurality of grooves for enhancing the adhesion of any coating layer applied thereto.

8. The sealing member of claim 1 wherein said first ceramic layer is composed of zirconia.

9. The sealing member of claim 8 wherein said zirconia is yttria stabilized.

10. The sealing member of claim 9 wherein the thickness of said first layer is about 0.010 inches.

11. The sealing member of claim 8 wherein said zirconia is ceria stabilized.

12. The sealing member of claim 1 wherein said first ceramic layer is composed of yttria stabilized hafnia.

13. A sealing member having a low coefficient of friction and good resistance to oxidation at high temperatures when rubbing against a ceramic material comprising:
   a superalloy substrate;
   a first ceramic layer;
   a second layer of a ceramic solid lubricant, said second layer having an outer surface with an array of discontinuous grooves, said array consisting of a repeating two row pattern comprising a first row in which adjacent grooves are orthogonal to each other and a second row in which adjacent grooves are parallel.

14. The sealing member of claim 13 in which said second row is staggered from said first row.

15. The sealing member of claim 14 wherein said grooves are evenly spaced from each other.

16. A sealing member having a low coefficient of friction and good resistance to oxidation at high temperatures when rubbing against a ceramic material comprising:
   a superalloy substrate;
   a first ceramic layer;
   a second layer composed in its entirety or in combination of calcium fluoride, zinc oxide, tin oxide, and nickel oxide, said second layer having an outer surface with a segmented morphology.

17. The sealing member of claim 16 where the thickness of said second layer is about 0.035 inches to 0.045 inches.

* * * * *